United States Patent [19]

Turner et al.

[11] Patent Number: 5,012,966
[45] Date of Patent: May 7, 1991

[54] CARD HOLDING DEVICE FOR USE WITH SHOPPING CARTS

[76] Inventors: Winnie M. Turner, 816 S. Mississippi Ave., Lakeland, Fla. 33801; Elmer E. Sawyer; Marie Sawyer, both of Rt. 2, Box 47-C, Bowling Green, Fla. 33834

[21] Appl. No.: 441,883

[22] Filed: Nov. 27, 1989

Related U.S. Application Data

[63] Continuation-in-part of Ser. No. 373,191, Jun. 29, 1989.

[51] Int. Cl.$^5$ ............................................. B60R 9/00
[52] U.S. Cl. ........................ 224/277; 206/556; 206/804; 280/33.992; 224/42.45 R; 40/308
[58] Field of Search ................ 224/277, 273, 42.43, 224/42.45 R, 42.42; 280/33.992; 221/254; 206/555, 556, 804; 40/308

[56] References Cited

U.S. PATENT DOCUMENTS

| | | | |
|---|---|---|---|
| 2,533,577 | 12/1950 | Godfrey | 206/804 |
| 3,236,371 | 2/1966 | Regis, Jr. et al. | 206/555 |
| 4,376,502 | 3/1983 | Cohen | 224/42.43 |
| 4,643,280 | 2/1987 | Hensley | 224/273 |
| 4,702,402 | 10/1987 | Ferri | 224/273 |
| 4,742,943 | 5/1988 | Trubiano | 224/277 |

Primary Examiner—Linda J. Sholl
Attorney, Agent, or Firm—Dominik, Stein et al.

[57] ABSTRACT

A holder for receiving articles, such as greeting cards, magazines, or the like. The holder is mountable within the basket of a shopping cart and has a vertical first panel and a vertical second panel and vertical sides on at least one of the panels for defining an open top. The holder also has a horizontal floor locatable between the panels, the floor being movable between a lower receipt orientation and an upper discharge orientation. The floor has a finger for effecting the movement of the floor between its orientations, and means for coupling the panels together and the holder to a shopping cart.

13 Claims, 3 Drawing Sheets

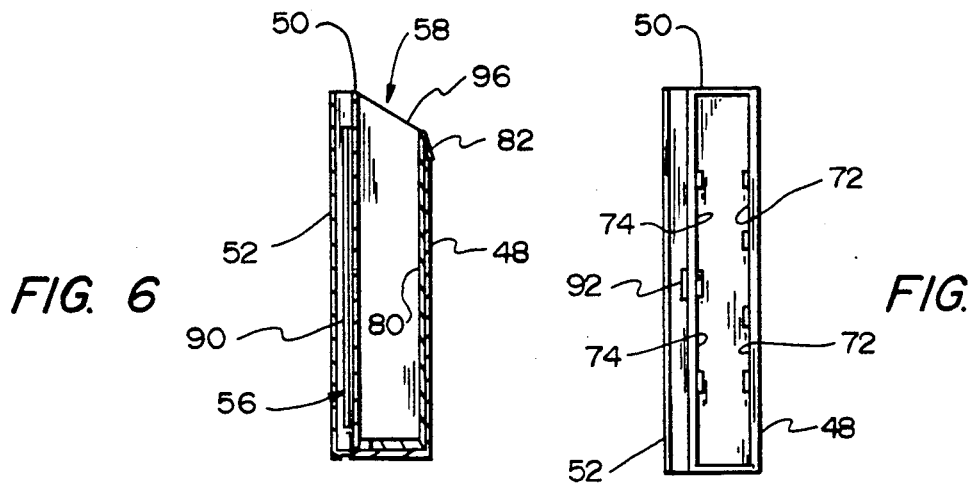
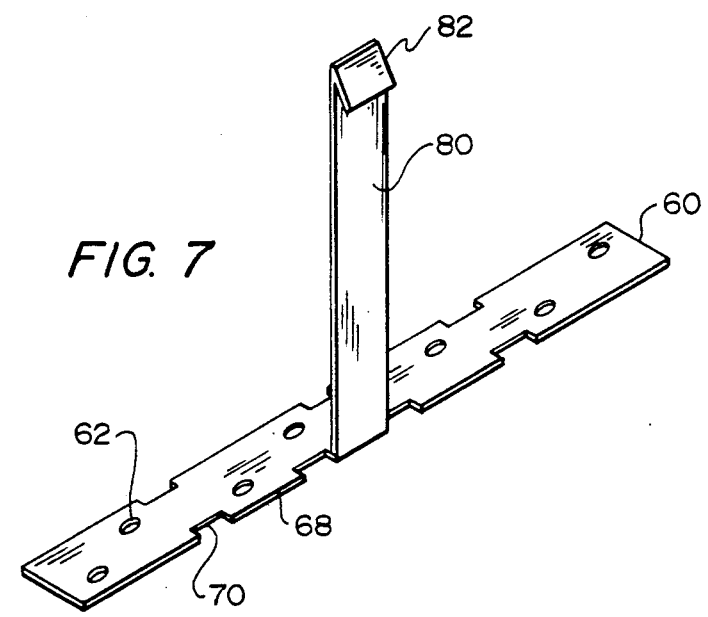
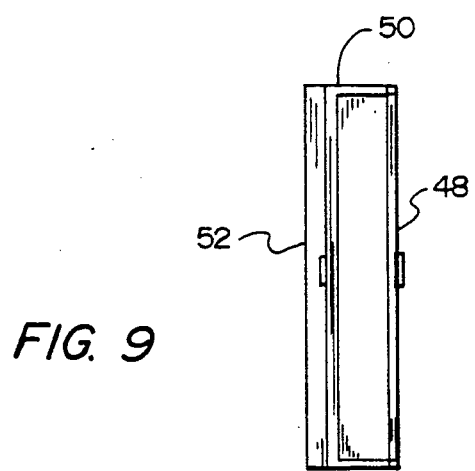

CARD HOLDING DEVICE FOR USE WITH SHOPPING CARTS

RELATED APPLICATION

This application is a continuation-in-part of U.S. patent application Ser. No. 07/373,191 filed Jun. 29, 1989.

BACKGROUND OF THE INVENTION

1. Field of the Invention

This invention relates to a card holding device for use with shopping carts and, more particularly, to a holder attachable to a shopping cart and having an open top with a liftable floor which rises to allow for the easy removal of greeting cards, magazines, or other articles held within the holder.

2. Description of the Background Art

It is a common practice for shoppers to utilize shopping carts for holding and transporting products while shopping. Shopping carts are wheeled vehicles pushed by shoppers through grocery stores. They allow for the purchase of a greater number of products than one could otherwise carry.

When products to be purchased are placed into a shopping cart, they normally contact one another. A problem arises when liquid or frozen products are placed in the cart in contact with dry products. When this occurs, moisture from the exterior surface of a liquid, frozen or otherwise wet product contacts and inadvertently dampens a dry product. This can damage certain types of dry products.

One solution to the problem is for the shopper to carefully position the products within the shopping cart so as to preclude dry and wet products from contacting one other. Such positioning, however, is a great inconvenience to the shopper who is often constrained by a desire to shop rapidly.

Perhaps the greatest inconvenience of such moisture damaged products occurs when greeting cards, magazines, or other paper products are purchased along with other normal products. When paper products get wet, they are rendered unacceptable for their intended purposes. One solution might be to simply hand carry the cards. Another solution might be to place the cards in a pocket or purse. Such solutions, however, are unacceptable since they run the risk of the shopper leaving the store without paying for them.

A wide variety of techniques are either employed commericially or are disclosed in the patent literature for carrying various types of products. Notes, for example, U.S. Pat. No. 1,577,298 to Roeller which discloses a container with packages or parcels for use in association with baby carriages. Note also U.S. Pat. No. 2,673,671 to Williams which discloses a container for coupling with a restaurant bus cart. Further, U.S. Pat. No. 2,633,278 relates to a container specifically designed to hold bottles within a grocery cart. U.S. Pat. No. 4,274,567 discloses a container for coupons adapted to be attached to a shopping cart.

In addition to the foregoing, U.S. Pat. No. 4,376,502 to Cohen discloses a nestable basket for use with nestable shopping carts and the like. U.S. Pat. No. 4,450,994 to Holland also discloses a coupon organizer for use with a shopping cart. Further, U.S. Pat. Nos. 4,702,402 to Ferri and 1,739,801 to Pitts discloses holders for paper.

Lastly, U.S. Pat. Nos. 110,379 to Ludlam; 1,334,717 to Silverman; and 1,917,480 to Widing all disclose containers with mechanisms for moving, or allowing the moving of, one article within a container with respect to the other articles.

As illustrated by the large quantity of background art and commercial devices, efforts are continuously being made in an attempt to improve shopping carts and containers for use therewith. No prior effort, however, suggests the present inventive combination of component elements arranged and configured as disclosed herein. Prior shopping cart containers do not provide the benefits attendant with the present invention. The present invention achieves its purposes, objects and advantages over the prior art through a new, useful and unobvious combination of component elements, through the use of a minimum number of functioning parts, and through the use of only readily available materials and conventional components.

It is, therefore, an object of the present invention to provide a shopping system comprising a shopping cart having a basket for receiving and holding products to be purchased, a frame with a handle at the upper rear end, and wheels beneath the frame for effecting movement throughout a market, the shopping cart also having a pivotable seat with a vertical section and horizontal section for a child at the rear end of the basket; and a holding device for greeting cards, magazines or the like mounted within the basket to the front vertical section of the seat, the holding device having vertical front, middle and rear panels with sides and with an open top, the holding device also having a horizontal floor located between the front and middle panels, the floor being movable between a lower receipt orientation and an upper discharge orientation and with a finger located adjacent to the front panel for effecting the movement of the floor between its orientations.

It is a further object of the present invention to receive and support greeting cards, magazines, or like paper products separately from other articles within a shopping cart.

It is yet a further object of the present invention to hold certain articles in a shopping cart while precluding contact thereof with other articles.

Lastly, it is an object of the invention to lift greeting cards, magazines or like articles from a shopping cart independent of other articles within the shopping cart.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a further understanding of the invention may be had by referring to the summary of the invention and the detailed description of the preferred embodiment in addition to the scope of the invention defined by the claims taken in conjunction with the accompanying drawings.

SUMMARY OF THE INVENTION

The present invention is defined by the appended claims with the specific preferred embodiment shown in the attached drawings. For the purpose of summarizing the invention, the invention may be provided in a shopping system comprising a shopping cart having a basket for receiving and holding products to be purchased, a frame with a handle at the upper rear end, and wheels beneath the frame for effecting movement throughout a market, the shopping cart also having a pivotable seat with a vertical section and horizontal section for a child at the rear end of the basket; and a holding device for greeting cards, magazines or the like mounted within the basket to the front vertical section of the seat, the holding device having vertical front, middle and rear panels with sides and with an open top, the holding device also having a horizontal floor located between the front and middle panels, the floor being movable between a lower receipt orientation and an upper discharge orientation and with a finger located adjacent to the front panel for effecting the movement of the floor between its orientations.

The sides of the rear panel adjacent to the middle panel are provided with cutouts for coupling the holding device to the shopping cart. The cutouts are vertically oriented to preclude vertical movement of the holding device with respect to the shopping cart. The system further includes cutouts which are horizontally oriented to preclude horizontal movement of the holding device with respect to the shopping cart. The upper edges of the panels are beveled from rear to front to facilitate nesting of a plurality of shopping carts.

In addition, the invention may be incorporated in a holder for receiving articles, the holder being mountable within the basket of a shopping cart, the holder having a vertical first panel and a vertical second panel and vertical sides on at least one of the panels for defining an open top, the holder having a horizontal floor locatable between the panels, the floor being movable between a lower receipt orientation and an upper discharge orientation, the floor having a finger for effecting the movement of the floor between its orientations, and means for coupling the panels together and the holder to a shopping cart.

The means for coupling is a third panel with sides having cutouts therein removably positioned adjacent to one of the other panels with a portion of the shopping cart therebetween. Such means for coupling is screws extending through the panels. The floor has projections receivable in recesses formed in at least one of the adjacent panels for guiding the movement of the floor between its orientations. The floor has projections receivable in recesses formed in both adjacent panels for guiding the movement of the floor between its receipt and discharge orientations. The holder recesses include edges adjacent to the upper and lower extents of the panels to limit the movement of the floor to within the holder. The components thereof may be fabricated of a rigid durable plastic. The components thereof may be fabricated of metal, preferably aluminum.

The foregoing has outlined rather broadly the more pertinent and important features of the present invention in order that the detailed description of the invention that follows may the better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other constructions for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 6 is a sectional view of a holder taken along line 6—6 of FIG. 2.

FIG. 7 is a perspective illustration of the floor of the holder.

FIG. 8 is a plan view of the top of the holder of the previous Figures but with the floor removed.

FIG. 9 is a bottom view of the holder of the previous Figures.

Similar reference characters refer to similar parts throughout the several figures.

DETAILED DESCRIPTION OF THE INVENTION

Figure 1:
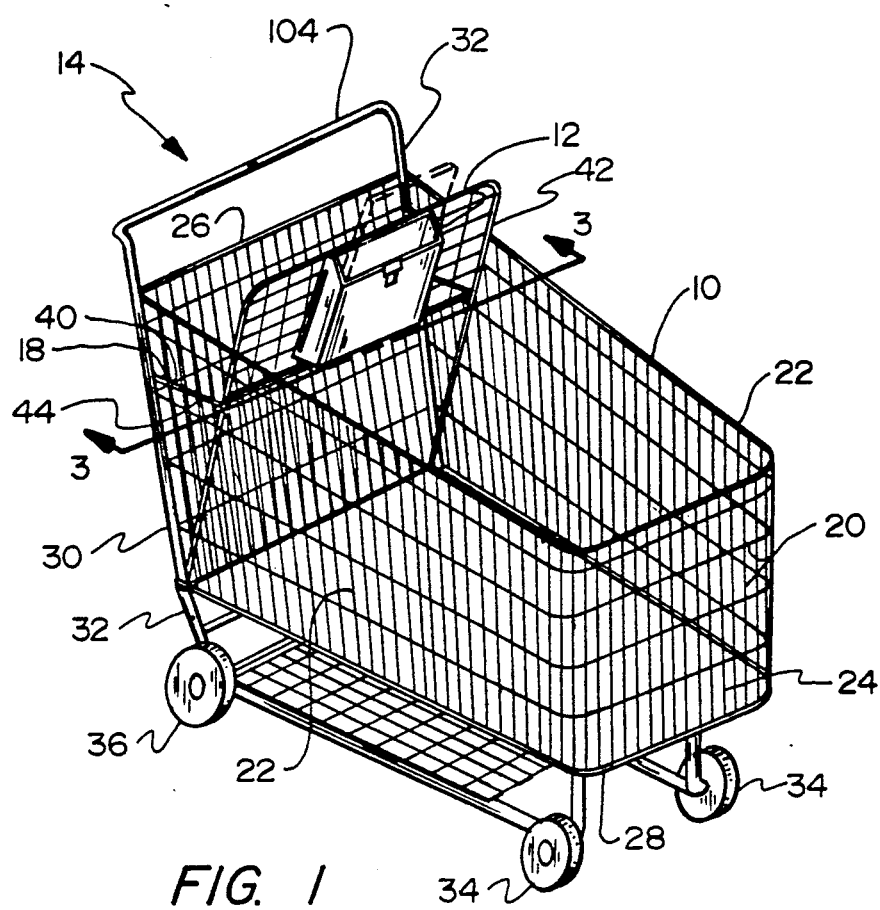
FIG. 1 is a perspective illustration of a shopping cart receiving and supporting a greeting card holder of the present invention.
Figure 2:
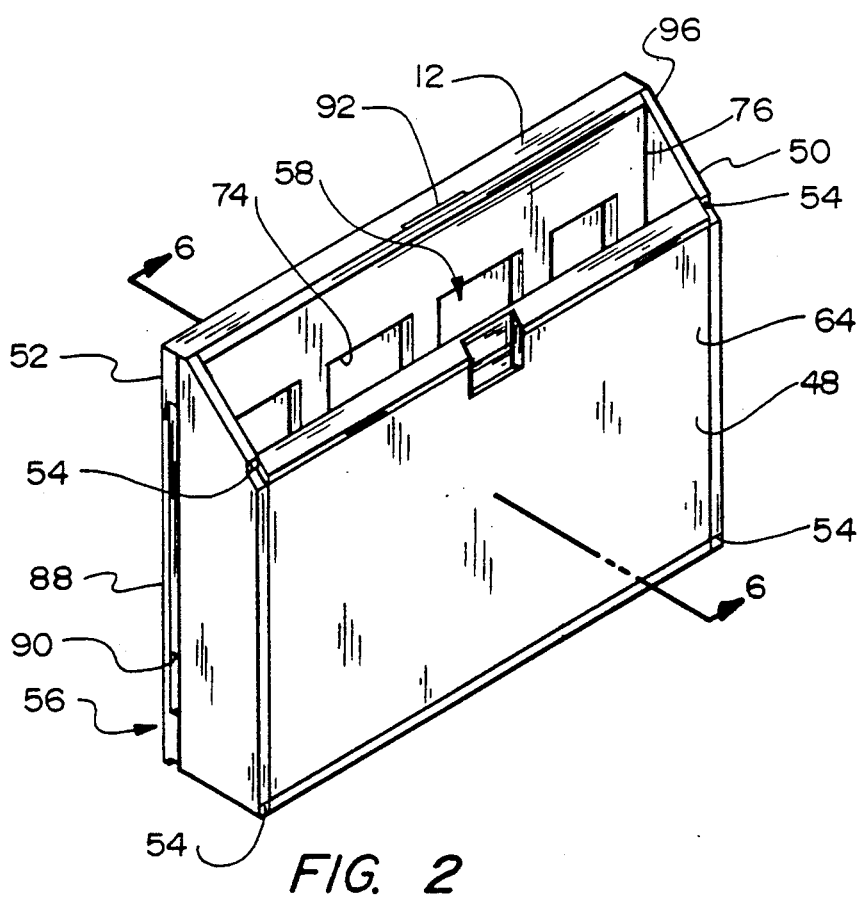
FIG. 2 is an enlarged perspective view of the greeting card holder shown in FIG. 1.

FIG. 1 is a perspective showing of a shopping cart 10 with an attached container or holder 12 constructed in accordance with the principles of the present invention. Together the cart and holder constitute a shopping system 14. The shopping cart 10 is of a conventional construction. The novelty of the present invention resides in the holder 12 which is designed for greeting card, magazines or like dry articles to be carried within the shopping cart by the shopper.

The shopping cart 10 is essentially conventional in its construction and functions with a basket 18 formed of open mesh wires 20 to constitute sides, front and rear walls 22, 24 and 26, and a supporting base 28. A frame 30 of tubes 32 supports the basket 18 at a convenient height. The frame 30 also supports wheels 34, 36. A handle 38 is located on the frame 30 adjacent to the upper rear end of the basket whereby the shopper may push the cart through the market. The front wheels 34 are preferably pivotable about vertical axes for pushing the shopping cart in an intended direction.

Figure 5:
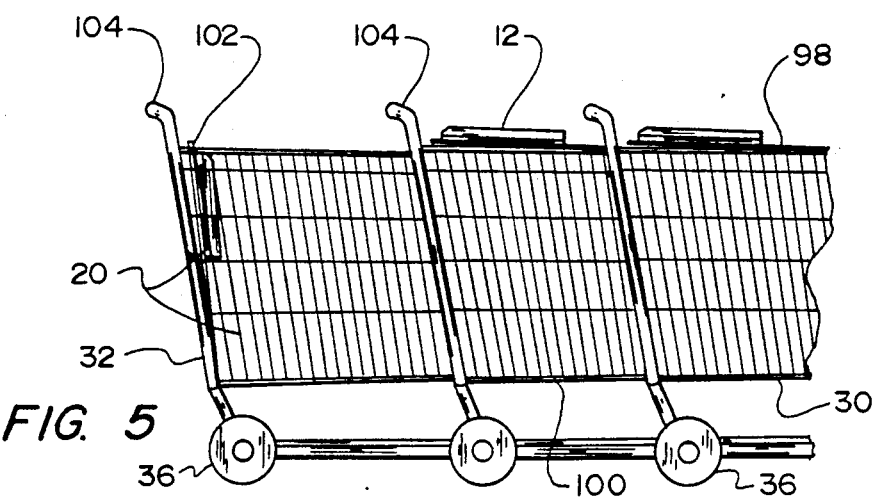
FIG. 5 is a side elevational view of a plurality of shopping carts in a nested orientation, the shopping carts being provided with the holders of the present invention.

Located within the shopping cart is a smaller seat area 40 generally intended to receive a small chid. The seat 40 includes a generally vertical section or wall 42 pivotably secured at its lower end to the rear wall 26 of the basket 18. The pivotable coupling is through the wires of which both components are constructed. A generally horizontal section or wall 44 is coupled at its rearward end to the rear wall 26 of the basket 18. Its forward end couples with the vertical wall 42 of the seat 40 to allow sliding movement between an inoperative, generally vertical, closed position as shown in FIG. 5 and an operative open position as shown in FIG. 1. A child may sit in the seat 40 when in the open position.

The entire rear wall 26 of the basket 18 is pivotable at its upper end about the upper rear end of the basket. In this manner, a plurality of shopping carts may nest, one inside the other, upon the closing of the seat and the raising of the rear wall of the basket to a generally horizontal orientation. Note FIG. 5.

The container or holder 12 of the present invention is adapted to be received and supported on the front surface of the vertical wall 42 of the seat 40. It is constructed of a rigid, lightweight durable plastic or metal. Aluminum is a suitable metal. It has parallel front, middle and rear plates 48, 50, 52 of a height and width to receive greeting cards of a typical size, about 5 inches by 8 inches and magazines up to a size of 7 inches by 9 inches. The front, middle and rear plates 48, 50, 52 are coupled adjacent their vertical edges to constitute a thickness of about 2¼ inches. Such connection is through screws 54 extending through horizontal holes in the front, middle and rear walls parallel with their vertical edges. The screws are threaded into holes in the rear plate. The screws are preferably flat headed machine screws receivable in countersunk holes of the front plates. This promotes safety by the user.

The height of the sides is generally equal to the height of the front, middle and rear walls except for a taper or angle at the upper edge. The thickness of the holder is relatively small with respect to the height. The holder provides a region 56 between the middle and rear plates 50, 52 for coupling the holder 12 to the cart 10. The holder also provides a holding volume space 58 between the middle and front plates 48, 50 for receiving greeting cards, magazines, and the like, of about 6¾ inches high, 9¼ inches wide and about 3¾ inch thick.

The upper edges of the front and middle walls and their sides define the space 58 for the receipt of the greeting cards, magazines or other articles to be carried. The lower surface of this space 58 is formed with a floor 60 fabricated of a rigid, lightweight material, plastic or metal, similar to that of the plates 48, 50, 52. The size of the floor is such that may be located within the parallel front and middle plates 48, 50 and sides of the holder 12. Such dimensions of the floor should be slightly smaller than that provided by the plates to allow the free, smooth sliding movement of the floor 60 upwardly to a discharge location and downwardly to a receipt location for the supported articles. The discharge and receipt locations are within the container adjacent the upper and lower edges of the plates 48, 50 respectively.

The floor 60 is provided with a plurality of apertures 62, holes drilled therethrough, so that miscellaneous small debris may fall through the container to preclude undesirable mixing with articles to be purchased. For those applications where the shopping carts are cleaned regularly, the holes need not be provided in the floor of the holders.

The front face of the front panel and the rear face of the rear panel are formed with rectangular recesses 64. Such rectanglar recesses are adapted to receive signs for advertising products or services.

Smooth movement of the floor upwardly and downwardly is facilitated by a plurality of spaced projections 68 extending from the front and rear edges of the floor. These projections are formed by parallel cutouts 70 and are received within slots 72, 74 formed on the facing surfaces of the front and middle plates 48, 50. These projections 68 and slots 72, 74 promote the constant horizontal orientation of the floor during its vertical movement between the lower supporting position and upper discharging position. The slots 72, 74 terminate short of the upper and lower edges of the panels to preclude inadvertent removal of the floor from the holder.

Movement of the floor 60 is effected by a finger 80 extending upwardly from the front edge of the floor. The finger 80 is located in a vertical slot in the rear surface of the front panel 48. The finger slot extends upwardly to the upper edge of the front panel 48 and downwardly short of the edge of the front panel 48. The finger 80 extends upwardly terminating in a horizontal portion or tab 82 to be held and moved by the shopper so as to effect the upward movement of the floor 60. This acts to lift the greeting cards, magazines or other articles 84 within the carrier and effect their removal. When the finger 80 is released, the floor 60 gravity falls to its lowermost position due to its own weight. Its downward movement is limited by the lower edge of the finger slot and the lower edge of the slots 72, 74.

A further feature of the inventive holder 12 resides in its coupling to, and support by, the cart 10. The rear plate 52 is formed of a vertical section with inwardly turned sides and bottom as well as top. The majority of the extent of the sides 88 have a C-shaped cutout 90 extending from near the top to near the bottom. Such cutouts 90 are on both sides and are adapted to be fitted through the horizontal wires 20 of the vertical wall 42 of the seat 40. In this manner, the rear plate 52, when positioned on the shopping cart 10, is rearwardly of the vertical seat wall 42 while the middle and front plates 48, 50 are forwardly of the seat wall 42 with the horizontal wires located within the C-shaped cutout 90. In addition, the upper and lower edges of the rear plate are formed of shorter C-shaped cutouts 92 for the receipt of the central vertical wires 20 of the vertical wall 42 of the seat. This combination of longer and shorter C-shaped cutouts allows the proper positioning of the holder 12 but yet allows full flush mating contact between the middle and rear plates 50, 52 of the holder 12 at their edges. This arrangement, in combination with the elongated screws, dissuades customers from removing holders and appropriating them for their own purposes.

The upper ends of the plates are beveled, at an angle 96 from rear to front of about 40 degrees. This bevel has been found necessary for certain types of shopping carts because of their dimensions and designs. Without such beveling, full nesting could not be effected. More specifically, when a forward cart 98 as shown in FIG. 5 has received a middle cart 100, the rear panel of the forward shopping cart is in an elevated, horizontal orientation. The middle cart has its rear panel in a lowered or vertical orientation. When, however, a rearward cart 102 is pushed into the back of the middle cart for nesting, the handle 104 of the forward cart would preclude the proper pivoting of the rear panel of the middle cart into its intended orientation elevated and horizontal when the seat 40 is in the open operative orientation. Due to the beveling, the holder 12 does not present an obstacle to the upward pivoting of the seat of the middle cart.

Figure 3:
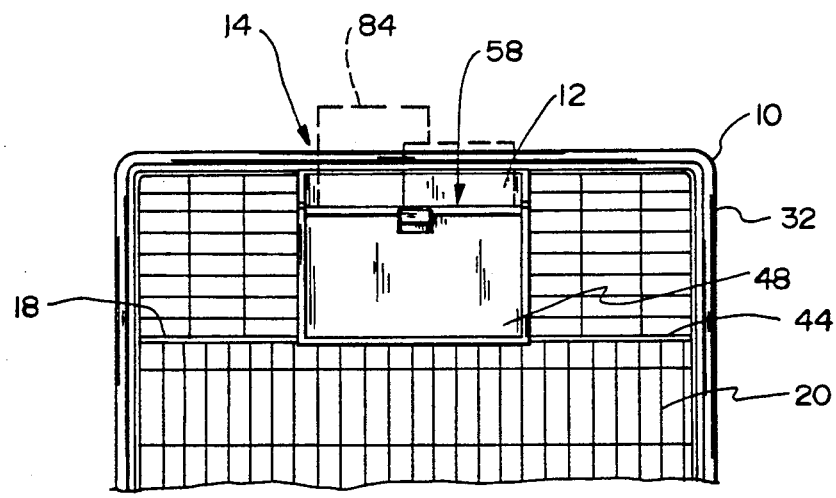
FIG. 3 is a front elevational view of the greeting card holder mounted on the shopping cart and showing, in dotted lines, a typical magazine and greeting card supported therein.
Figure 4:
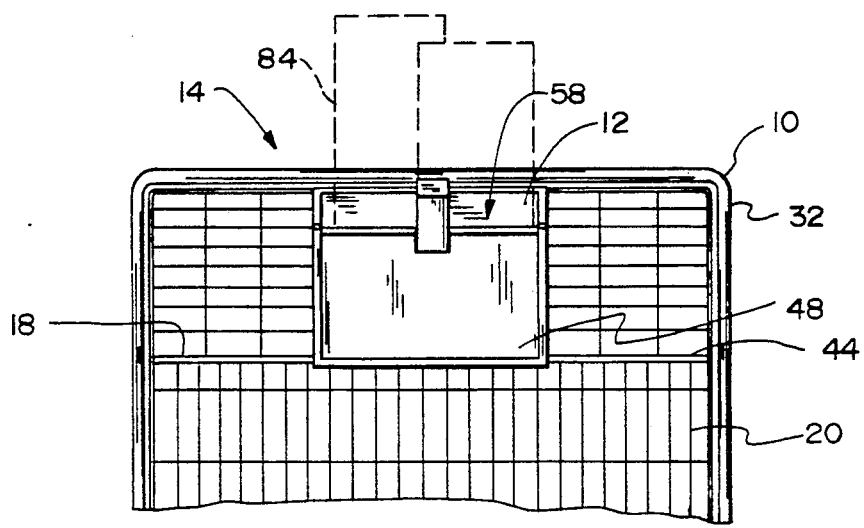
FIG. 4 is a front elevational view similar to FIG. 3 but with the floor of the holder raised for removal of the held articles.

In operation and use, the shopper simply uses the cart 10 in the normal conventional manner for shopping. When purchasing greeting cards, magazines or other dry articles 84 which the shopper does not wish to dampen through contact with other articles in the basket 18, such dry articles will be placed in the holder 12 through the upper open end into the space 58. When shopping is completed, the cart is pushed to the check out area where the articles 84 from the basket area of the cart are removed, paid for, and bagged. The tab 82 of the holder 12 is lifted for the removal of its contents. Compare FIGS. 3 and 4. The dry articles 84 are then removed and paid for and separately bagged. The shopping cart 10 with empty holder 12 is then pushed to an area near the entrance door of the market. The carts 10 may then be nested one within the other in the conventional manner with the rear panel of the basket elevated to an essentially horizontal position for receiving the front end of an adjacent shopping cart. In this orientation, the carriers are located in horizontal alignment with respect to each other separated by the height of the carrier. Note FIG. 5.

The present disclosure includes that contained in the appended claims as well as that of the foregoing description. Although this invention has been described in its preferred form with a certain degree of particularly, it is understood that the present disclosure of the preferred form has been made only by way of example and numerous changes in the details of construction and combination and arrangement of parts may be resorted to without departing from the spirit and scope of the invention.

Now that the invention has been described, what is claimed is:

1. A shopping system comprising:
a shopping cart having a basket for receiving and holding products to be purchased, a frame with a handle at the upper rear end, and wheels beneath the frame for effecting movement throughout a market, the shopping cart also having a pivotable seat with a vertical section and horizontal section for a child at the rear end of the basket; and
a holding device for greeting cards and magazines mounted within the basket to the front vertical section of the seat, the holding device having vertical front, middle and rear panels with sides and with an open top, the holding device also having a horizontal floor located between the front and middle panels, the floor being movable between a lower receipt orientation and an upper discharge orientation and with a finger located adjacent to the front panel for effecting the movement of the floor between its orientations.

2. The system as set forth in claim 1 wherein the sides of the rear panel adjacent to the middle panel are provided with cutouts for coupling the holding device to the shopping cart.

3. The system as set forth in claim 2 wherein the cutouts are vertically oriented to preclude vertical movement of the holding device with respect to the shopping cart.

4. The system as set forth in claim 3 and further including cutouts which are horizontally oriented to preclude horizontal movement of the holding device with respect to the shopping cart.

5. The system as set forth in claim 1 wherein the upper edges of the panels are beveled from rear to front to facilitate nesting of a plurality of shopping carts.

6. A holder for receiving articles, the holder being mountable within the basket of a shopping cart, the holder having a vertical first panel and a vertical second panel and vertical sides on at least one of the panels for defining an top, the holder having a horizontal floor locatable between the panels, the floor being movable between a lower receipt orientation and an upper discharge orientation, the floor having a finger for effecting the movement of the floor between its orientations, and coupling the panels together and the holder to a shopping cart, the coupling means including a third panel with sides having cutouts therein removably positioned adjacent to one of the other panels with a portion of the shopping cart therebetween.

7. The holder as set forth in claim 6 wherein the coupling means includes screws extending through the panels.

8. The holder as set forth in claim 6 wherein the components thereof are fabricated of a rigid durable plastic.

9. The holder as set forth in claim 6 wherein the components thereof are fabricated of metal.

10. The holder as set forth in claim 8 wherein the metal is aluminum.

11. A holder for receiving articles, the holder being mountable within the basket of a shopping cart, the holder having a vertical first panel and a vertical second panel and vertical sides on at least one of the panels for defining an open top, the holder having a horizontal floor locatable between the panels, the floor being movable between a lower receipt orientation and an upper discharge orientation, the floor having a finger for effecting the movement of the floor between its orientations, and coupling means for coupling the panels together and the holder to a shopping cart, the floor having projections receivable in recesses formed in at least one of the adjacent panels for guiding the movement of the floor between its orientations.

12. The holder as set forth in claim 11 wherein the floor has projections receivable in recesses formed in both adjacent panels for guiding the movement of the floor between its receipt and discharge orientations.

13. The holder as set forth in claim 12 wherein the recesses include edges adjacent to the upper and lower extents of the panels to limit the movement of the floor to within the holder.

* * * * *